(12) United States Patent
Smith et al.

(10) Patent No.: US 9,793,962 B2
(45) Date of Patent: Oct. 17, 2017

(54) PROCESSING NEAR FIELD COMMUNICATIONS BETWEEN ACTIVE/PASSIVE DEVICES AND A CONTROL SYSTEM

(75) Inventors: Darin William Smith, Plano, TX (US); Rashid Skaf, Plano, TX (US); James Pautler, Plano, TX (US)

(73) Assignee: AMX LLC, Richardson, TX (US)

( * ) Notice: Subject to any disclaimer, the term of this patent is extended or adjusted under 35 U.S.C. 154(b) by 398 days.

(21) Appl. No.: 13/493,175

(22) Filed: Jun. 11, 2012

(65) Prior Publication Data

US 2012/0315848 A1    Dec. 13, 2012

Related U.S. Application Data

(60) Provisional application No. 61/495,498, filed on Jun. 10, 2011.

(51) Int. Cl.
*H04B 5/00*    (2006.01)
*H04B 5/02*    (2006.01)

(52) U.S. Cl.
CPC ............. *H04B 5/02* (2013.01); *H04B 5/0031* (2013.01)

(58) Field of Classification Search
CPC ................................ H04B 5/0031; H04B 5/02
USPC ............................................... 455/41.1, 41.2
See application file for complete search history.

(56) References Cited

U.S. PATENT DOCUMENTS

| | | | |
|---|---|---|---|
| 2008/0272889 A1* | 11/2008 | Symons | 340/10.1 |
| 2009/0191811 A1* | 7/2009 | Griffin et al. | 455/41.1 |
| 2010/0002623 A1* | 1/2010 | Bims | 370/315 |
| 2010/0190437 A1* | 7/2010 | Buhot | 455/41.1 |
| 2011/0007901 A1* | 1/2011 | Ikeda et al. | 380/270 |
| 2011/0076941 A1* | 3/2011 | Taveau | G06Q 10/10 455/41.1 |
| 2011/0102854 A1* | 5/2011 | Cho et al. | 358/403 |
| 2011/0143663 A1* | 6/2011 | Renard | G06Q 20/32 455/41.1 |
| 2012/0117167 A1* | 5/2012 | Sadja | G06F 17/3089 709/206 |
| 2012/0278452 A1* | 11/2012 | Schmitz | H04L 63/0807 709/220 |

\* cited by examiner

*Primary Examiner* — Xin Jia (57) ABSTRACT

Disclosed are example near field communication (NFC) devices and methods of operation configured to provide a user with easy access to operating a control system. One example method of operation may include accessing an application on a mobile device and identifying a user information parameter. The method may also provide generating a near field communication message that includes the user information parameter and transmitting the near field communication message to initiate a control procedure.

14 Claims, 6 Drawing Sheets

PROCESSING NEAR FIELD COMMUNICATIONS BETWEEN ACTIVE/PASSIVE DEVICES AND A CONTROL SYSTEM

CROSS-REFERENCE TO RELATED APPLICATIONS

This invention claims priority to provisional application Ser. No. 61/495,498, filed on Jun. 10, 2011, entitled "Near field Communication input to a Control System", the entire contents of which are hereby incorporated by reference.

TECHNICAL FIELD OF THE INVENTION

This invention relates to a method and apparatus of identifying and processing near field communication information sessions to perform resulting tasks through a corresponding control system.

BACKGROUND OF THE INVENTION

Conventionally, wireless communications may be used to perform a variety of interactive transactions with a control system (i.e., providing a control command or result). Such interactions are generally one-way in nature, but are still used to provide input to a control system or to receive output from a control system.

In general, wireless communication signaling has limited functionality with a control system. In order to create a series of operations or controls that are tied to a wireless communication interface, additional designs and implementations must be refined to accommodate a substantive response to a user's interaction with a wireless communication control systems.

SUMMARY OF THE INVENTION

One embodiment of the present invention may include a method that includes accessing an application on a mobile device and identifying at least one user information parameter. The method may also include generating a near field communication message that includes the at least one user information parameter and transmitting the near field communication message to initiate a control procedure.

Another example embodiment of the present invention may include an apparatus including a processor configured to access an application on a mobile device and identify at least one user information parameter. The processor may also generate a near field communication message that includes the at least one user information parameter. The apparatus may also include a transmitter configured to transmit the near field communication message to initiate a control procedure.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, mobile devices may include mobile phones and tablet computing devices. However, the user device may be a computer, laptop, mobile, wireless or cellular phone, a PDA, a tablet, a client, a server or any device that contains a processor and/or memory, whether that processor or memory performs a function related to an embodiment of the invention.

The control surface may represent a user interface (UI) for a control system featuring a display and corresponding processing computer or system. A control system may be a networked computing device that executes a customizable program allowing for scheduling and control of various assets, such as but not limited to lighting, motor control, video and audio switching, monitor projectors, and computer interactions in general. Server computers may be used to provide either content (e.g., spreadsheets, documents, presentations, video playback), databases, or applications. Video servers are devices that provide streaming video content to a video switcher, projector, or some other device.

Example embodiments provide near field communication (NFC) technology which is used to perform a variety of interactive transactions with a control system, such as identify data provided from a mobile device to a control system, identify and/or authenticate a specific user and/or user device with the control system, customize a user's control surface and user interface (UI), recall user-customized presets to a particular environment (e.g., lighting, HVAC, active devices, video source selection, etc.). The control system and NFC may also be used to register an activity room and/or certain resources as being "in-use", and activate or revoke permissions for user-locked features of a control system (e.g., licensed features, security controls, and/or controlled resource(s)) including parental control in a home environment. The control system may also provide a recall for user-scheduled content on a managed content server and/or a presentation system, and permit inputted hyperlinks or bookmarks from a mobile device to the control system or a corresponding peripheral device.

Figure 1A:
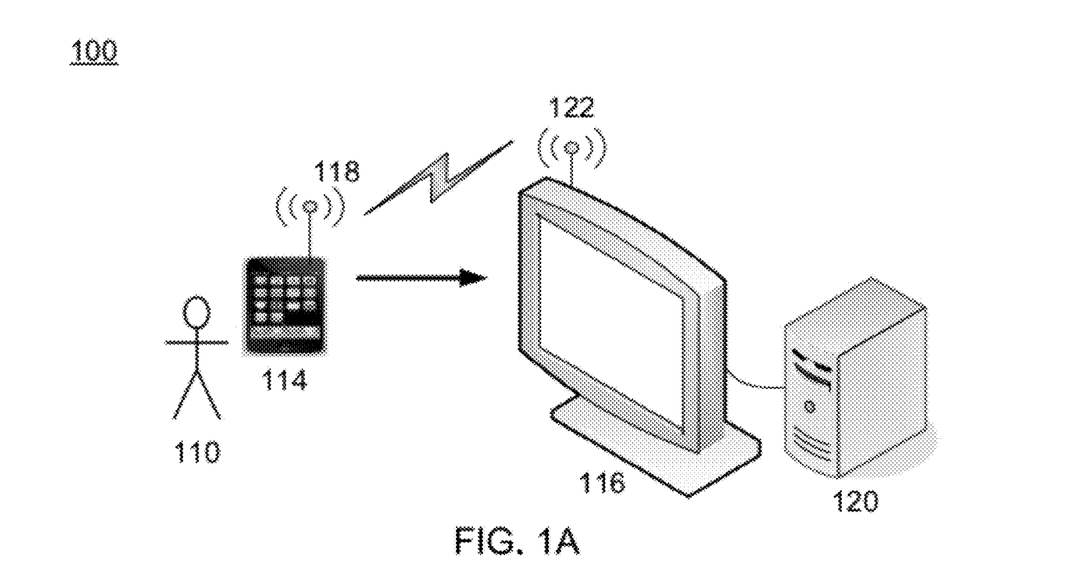
FIG. 1A illustrates example network configuration with a control system configured to operate with near field communication (NFC), according to example embodiments of the present invention.

FIG. 1A illustrates an example near field communication (NFC) interaction environment 100 according to example embodiments. Referring to FIG. 1A, the user 110 may operate a mobile station 114 (i.e., smartphone), which is configured with a wireless antenna and transceiver 118 used to communicate wirelessly to a control system transceiver 122 coupled to a computer display device 116 and corresponding computer or server 120. The NFC session may be used to allow a login function, an information sharing function, or other communication function.

Figure 1B:
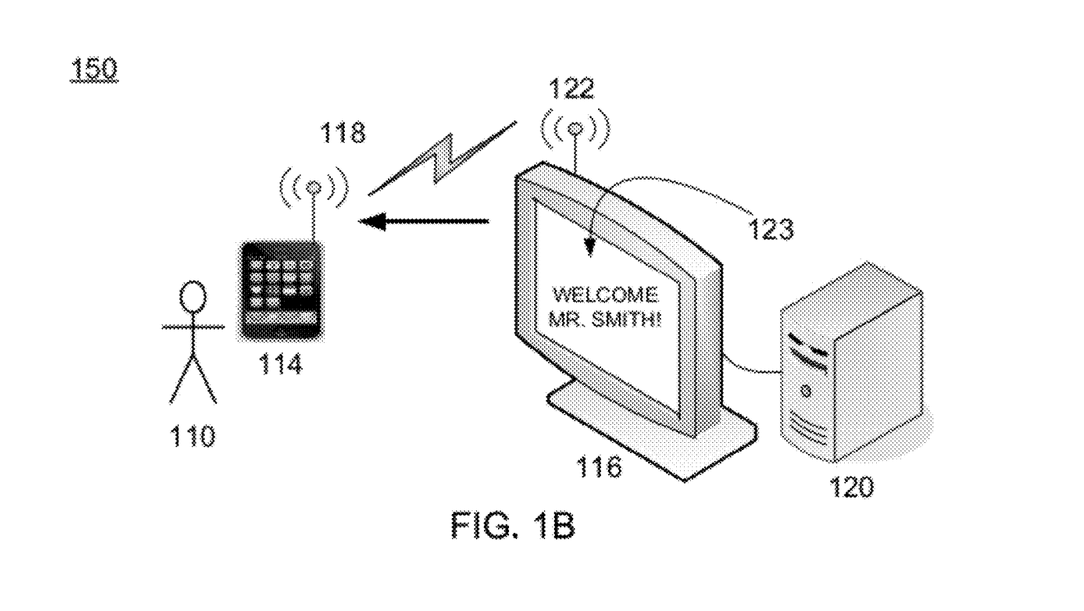
FIG. 1B illustrates an example network configuration with a mobile station initiated near field communication (NFC) session with a control system, according to example embodiments of the present invention.

FIG. 1B illustrates another example NFC interaction 150 according to example embodiments. Referring to FIG. 1B, the user 110 may initiate a command, request, data authentication, etc., and the user agent application may generate a resulting NFC message on his or her own smartphone device. The message may then be transmitted to the receiver 122 and corresponding computer 120. As a result, the user may be identified by a particular code, and a message 123 may be displayed on the display device acknowledging the user's presence.

In FIG. 1A, a transfer of data is performed from the control system computer 120 to a mobile device 114 by a NFC message 118. Examples of such information transferred may include a one-time guest login credential for wireless networks interfaced with the control system. Sharing hyperlinks or bookmarks from a control system or the attached peripheral or computer 120 to the mobile device 114, and a hand-off control to a mobile application (e.g., a remote frame buffer (RFB) to a touchpanel display from the mobile device).

In FIG. 1B, for cases of transferring data from a mobile device 114 to a control system computer 120, the control system must employ an application to process the NFC messages received. In operation, the user would initiate an action by activating a NFC application on the mobile device 114, as well as a corresponding application, such as a user ID application on the mobile device 114. Once the mobile device application generates the appropriate NFC message, the user would initiate a data transfer via an option on the screen of the mobile device as illustrated in FIG. 1B.

Upon a successful reception of the NFC message transferred from the mobile station, the control system would perform the action directed by the mobile application, for example, to configure a meeting room for the user's preferences (e.g., projector on/off, automatic screen down/up, software application launched, user files accessed, etc.). The user's credentials, preferences and other related information may be stored in a databank associated with the corresponding server 120 of the control system. The example communication and interaction scenarios reduce the user's interaction to a simple series of button selections without any data string inputs or other information submissions (i.e., login username, IP address, etc.), which can be easily mistyped or forgotten.

Figure 3:
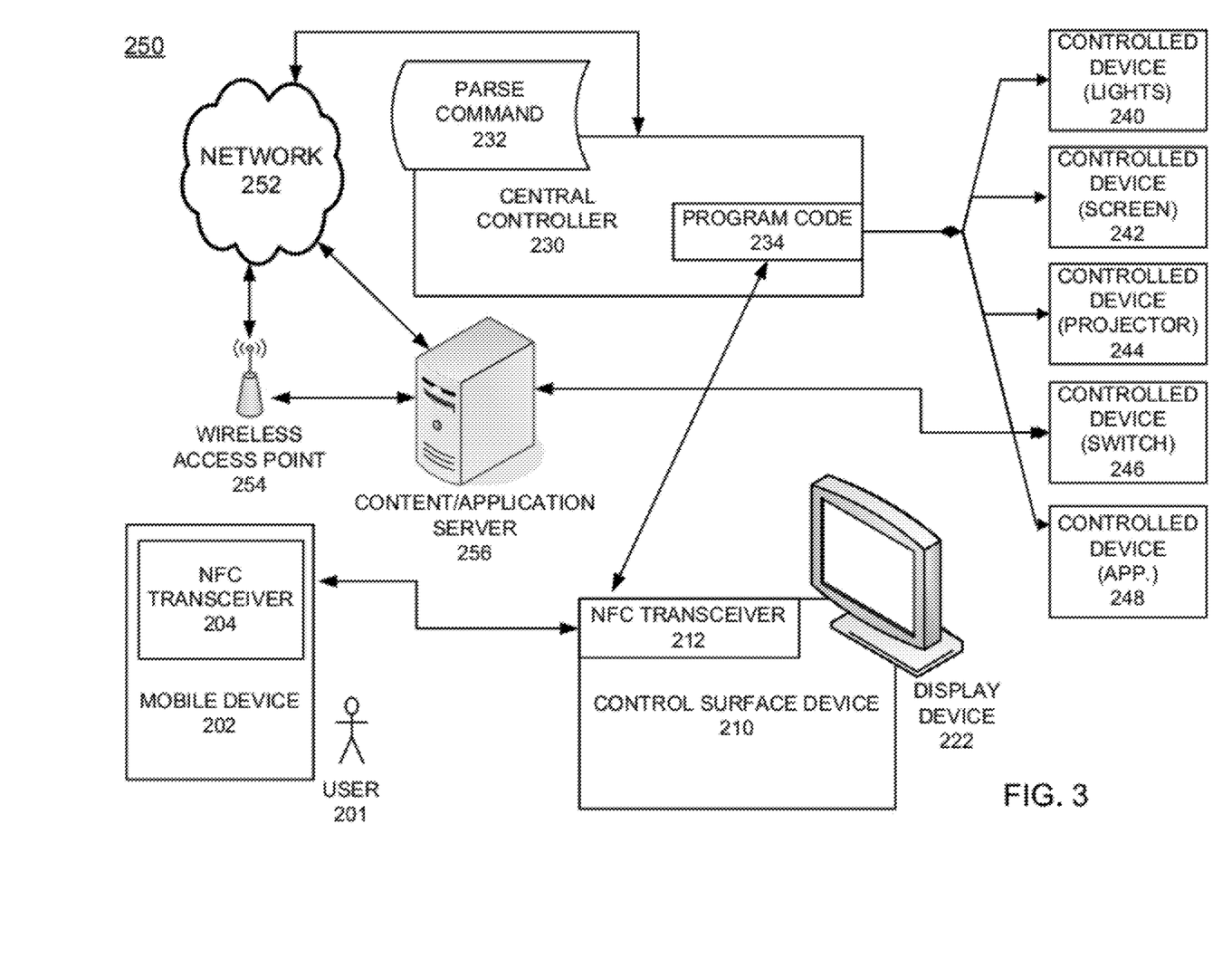
FIG. 3 illustrates an example active near field communication (NFC) communication session between a mobile station and a control system, according to an example method of operation of the present invention.

Example embodiments of the NFC communication sessions may utilize a 13.56 MHz NFC/RFID communication channel implementing standards, such as but not limited to ISO/IEC 18092/ECMA-340 (NFCIP-1), ISO/IEC 21481/ECMA-352 (NFCIP-2), ISO/IEC 14443 type A and B, FeliCa, NDEF (NFC data exchange format). Examples of passive tags and badges (unpowered proximity devices) may be implemented in accordance with 13.56 MHz NFC, with or without writable storage. Examples of active tags, badges, and mobile devices may include mobile phones and tablet computing devices implementing 13.56 MHz NFC. A control surface may be a user interface (UI) for a control system. The control surface would implement a 13.56 MHz NFC transceiver (XCVR) in order to communicate with the mobile station 114. The control system may include a networked computing device that operates a customizable program allowing for scheduling and control of various assets, such as but not limited to lighting, motor control, video and audio switching, monitor and projectors, and computer interaction. Servers may include computers providing content (e.g., spreadsheets, documents, presentations, video playback), databases, or applications. One example server may include a video server device that provides streaming video content to a video switcher, projector, or some other device as illustrated in FIG. 3.

The near-field communication (NFC) technology may be used in both passive and active modes to perform a variety of interactive transactions with a control system, such as identify a specific user token to a control system in passive use cases. Additional use cases may include to identify and/or authenticate a specific user or device with a control system, customize user's control surface UI experience, recall user-customized presets to an environment (e.g., lighting, HVAC, active devices, video source selection), register room/resources as 'in-use', activate or revoke permissions for user-locked features of a control system (e.g., licensed features, security controls, or controlled resources including parental control in a home environment), to utilize an "electronic key" to the control system, recall user-scheduled content on a managed content server and/or presentation system, store a token on compatible tags/devices that may be utilized to save a state of an environment or presentation, and activate data-exchange between control system components and a mobile device (e.g., file-transfer via Bluetooth or Wi-Fi), with automated passing of credentials and storage locations.

Examples of active use cases may include to synchronize mobile device information (e.g., phone/email address book) with a control system or managed conferencing system. Other examples may include to securely pass login credentials for wireless networks interfaced with the control system, to share hyperlinks or bookmarks between a mobile device and the control system and any attached peripheral, including computers or the control surface itself, to purchase and/or activate control system software enhancements/applications, to join a collaborative session of an application (e.g., annotation or whiteboarding) with importation of user preferences.

Examples of passive use cases may include user identification initiated by a passive NFC tag (e.g. a badge or keyfob), an NFC capable accessory device (e.g., a remote control), or an NFC-capable mobile device (e.g., mobile phone) being held within the activation range of the NFC receiver. The NFC receiver may be implemented on an ancillary control system device, either a dedicated receiver or integrated into another piece of equipment (e.g., control surface, touch panel, user interface device). When within range, the passive tag is activated and interrogated and delivers a unique identification string to the reader device. The reader device then informs the control system of the details of the event as well as performs some actions directly if necessary to support the intended outcome.

For active use cases, an active-NFC capable device (e.g., a mobile phone) utilizes a specialized application to format commands and/or URIs to input data to the reader (when within range) that will cause the specified action to be communicated to the control system, and from a compatible application on the control system to any ancillary devices or network resources. Active NFC uses can also include credentials exchanged for setting up other network connections. In this case, the necessary credentials (e.g., service set identifier (SSID)/PAN ID, encryption passcodes, etc.) are passed bi-directionally and securely employing challenge/response as necessary between the network manager, control system, and NFC interface to achieve an automated connection with a minimum amount of user interaction.

Example embodiments may provide a network sign-on operation that includes an active NFC exchange of credentials that keeps the user from needing to memorize specific SSID information, encryption types, passphrases, etc. This not only makes the user experience easier, but adds a layer of security, as human knowledge of passphrases can be minimized. Active transfer use cases may include the simplified and automated transfer of content whether by NFC directly for a phone number or URI synchronization, or via another protocol to transfer larger files which allow the user's intentions to be communicated to the control system directly for saving time and enabling the entire controlled environment more user-friendly and productive. For passive transfer use cases, the unique identification of the user can be employed to greatly simplify customization of the user environment, as well as to track usage of assets and facilities and/or to restrict access to certain features or controls dependent upon operator identity.

Figure 2:
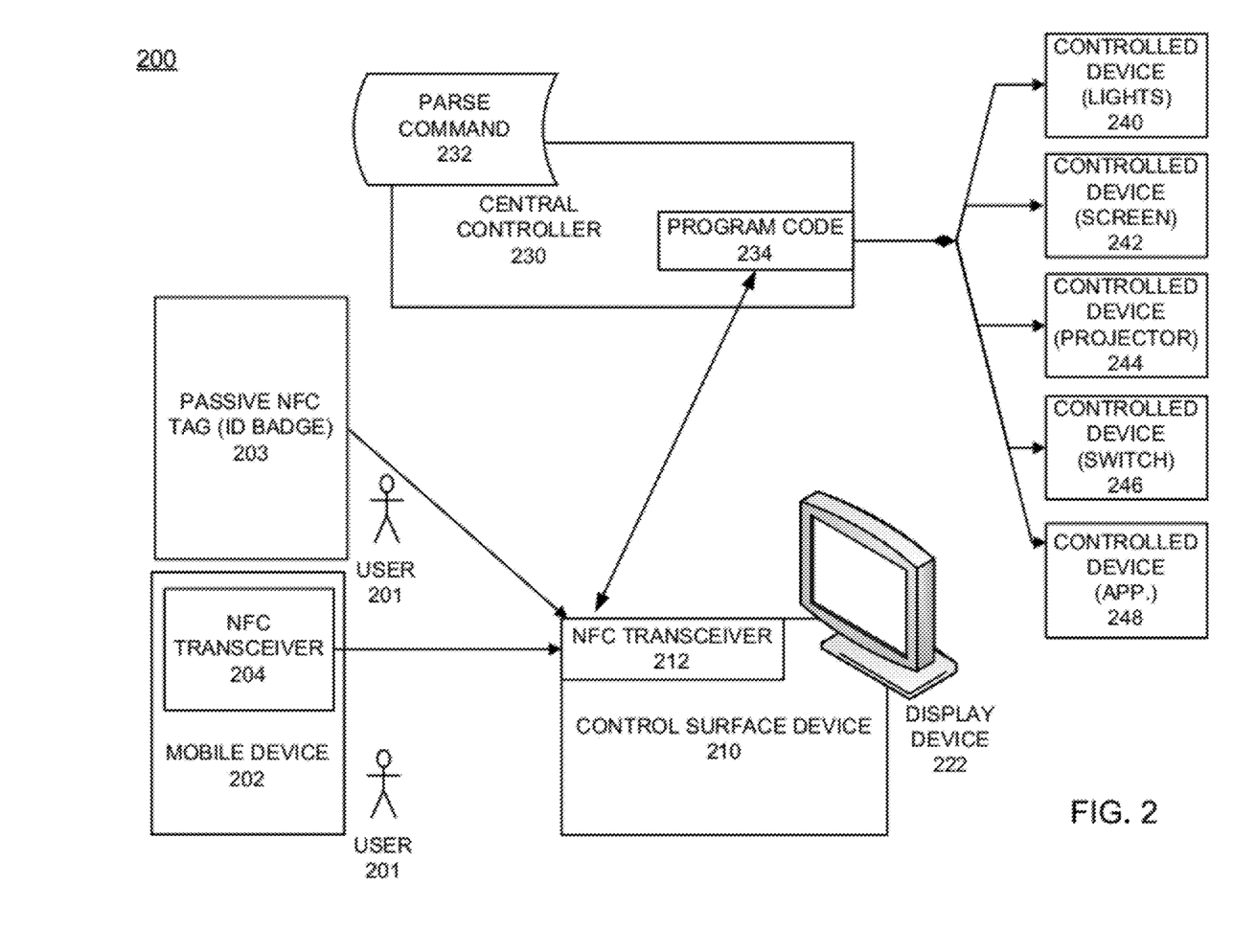
FIG. 2 illustrates an example passive near field communication (NFC) session, according to an example method of operation of the present invention.

FIG. 2 illustrates an example passive NFC interaction between a mobile station and a control system according to example embodiments. Referring to FIG. 2, the NFC interaction network 200 may include a user 201 operating a mobile station device 202 with a NFC transceiver 204. The mobile device may include a NFC message generation application that is capable of receiving input commands and creating corresponding NFC messages on the mobile device. Once a message is generated the user may transmit the message to a NFC transceiver 212 associated with a control surface device 210, which may include a computer (not shown) and a display device 222.

Once the message has been received by the NFC transceiver 212, the user may be identified by a user databank and an application-specific token may be generated and sent to a central controller device 230. The program code information may be received and interpreted to control one or more controlled devices/peripherals, such as, lights 240, a display screen 242, a device projector 244, a switch 246 and/or a device application 248. A parse command function 232 may be a script used to parse any commands from the user generated control information.

In the use case example illustrated in FIG. 2, the user may bring a passive NFC device 203 (e.g., tag, keyfob, badge, mobile phone in passive NFC mode, etc.) within range of the NFC transceiver 212 on a control surface device 210. The control surface NFC transceiver may periodically poll for devices within range. When the transceiver 212 has detected a device within range either by active interrogation or a RF field monitoring operation, the control surface NFC transceiver 212 will interrogate the device(s) 202/203 within range, utilizing a protocol that is mutually supported by both the passive device and the control surface NFC transceiver 212. Using the same compatible protocol, the passive NFC device 203 will respond to an inventory interrogation by emitting a unique tag ID or token. Some passive devices may implement multiple tokens. In certain cases, the control surface NFC transceiver may interrogate additional tokens from the passive device. The security of the transfer is protected via the methods employed by the NFC protocol in use.

Upon successful reception of the unique token(s), the control surface device may take immediate action by transferring the token(s) to its associated central controller 230 via a string message(s) in an internet control system protocol (ICSP) protocol. The central controller 230 may forward the token to other central controllers as dictated by system programming via ICSP master-to-master capabilities or may optionally validate the token against an internal or external user or device database via a parser function 232. The database may implement permissions not only for use of the token, but for preferences and enablement of control system applications, features, or devices. Upon confirmation of acceptability by the program code 234, the program code 234 on the central controller 230 may send control messages via as many differing protocols as necessary in order to configure the environment and equipment to the user or the user device's 202/203 registered preferences.

As an example, a user may present a passive device 203 to the NFC transceiver 212 on the control surface, causing the room to be configured for a videoconference, such as dimming lights to a preferred level, activating a videoconferencing system, configuring a video switch to the videoconference source, lowering a projection screen, and activating a projector and camera. Another example may result in the central controller 230 commanding the screen 242, projector 244, video switcher 246, and lights 240 to a PC presentation, and sending commands to a service on a PC to launch a presentation application 248 and access the user's home directory.

FIG. 3 illustrates an example active NFC interaction between a mobile station and a control system according to example embodiments. Like elements illustrated in FIG. 2 may be the same as the corresponding elements illustrated in FIG. 3. Referring to FIG. 3, the NFC interaction network 250 may include a user 201 operating a mobile station device 202 with a NFC transceiver 204. The mobile device 202 may include a NFC message generation application that is capable of receiving input commands and creating corresponding NFC response message on the mobile device 202. Once a message is generated, the user may transmit the message to a transceiver 212 of a control surface device 210, which may include a computer (not shown) and a display device 222.

In FIG. 3, a data exchange session may be activated between the control system components and the mobile device 202. For example, transferring of user contact information from an address book application on the mobile device or a remote database, transferring a web link, transmitting a token to join an annotation session and/or transmitting credentials for pairing the mobile device 202 with a Bluetooth or WiFi access point connection are all examples of NFC communications between the mobile device 202 and the control system.

In operation, the user 201 may activate a data exchange session between the control system components and the mobile device 202 (e.g., file transfer via Bluetooth or WiFi), with automated passing of credentials and storage locations. For active use cases, the user 202 may present an active NFC device (e.g., mobile phone) running an active NFC application within range of the NFC transceiver 212 on a control surface device 210.

The control surface NFC transceiver 212 periodically polls for devices within range by transmitting a poll message and receiving a response or beacon signal from any listening devices operating a NFC application. When the transceiver 212 has detected a device within range either by active interrogation or some RF field monitoring procedure, the control surface NFC transceiver 212 will interrogate the device(s) within range, utilizing a protocol that is mutually supported by both the device 202 and the control surface NFC transceiver 212. Using the same compatible protocol, the active NFC device 202 will respond to the interrogation by indicating its capabilities, credentials and other helpful information. The device 202 will then transmit a request for credentials for a wireless network (e.g., WiFi or Bluetooth).

The control surface 210 forwards the network credentials request to the central controller 230, which may include a user ID token. The central controller 230 may validate the user/token before proceeding with acquiring the network credentials. If allowed, the central controller 230 will interact with an access point 254 or network controller to obtain network credentials, such as SSID, encryption types, passphrases, etc., on behalf of the mobile device 202. If successful, the network credentials are passed back to the control surface 210, which utilizes the NFC to deliver the credentials to the mobile device 202.

The network credentials can be any type of data necessitated by the connection protocols to enable use of the communication medium. As an example, the network controller may utilize a 802.1X communication protocol with a RADIUS communication server to authorize the user. Such an authentication procedure would be performed by the prior authorization and identification of the user or device on the central controller 230. The central controller 230 can continue configuring the environment in a manner similar to the above-noted example by control messages to devices that are programmed for such automation in the program code of the central controller 230. Simultaneously, the mobile device 202 can now utilize the provided network credentials to join the wireless network without further user interaction or user knowledge of passphrases. Network sign-on operations may become seamless to the user, and security can be enhanced by the use of one-time logon passcodes that are automated and are not presented to the user.

After signing on, the user mobile device 202 may now interact with devices on the network, cloud computing services, etc., as the mobile device application(s) permits. As an example, a mobile device application may allow the user to select content from a content/application server 256 and control playback. Since the control system has set up other devices, and may also have a control operation to the video server 256, the user may control video playback either from the mobile device 202 or through the control surface.

It should be understood and readily apparent that any usability enabled by the above-noted passive operation devices are also supported under a use-case for active operation devices. Starting a phonebook or email address synchronization application may be performed between the mobile device 202 and the control surface device 210 directly via active NFC, or via another medium like Bluetooth or WiFi. This data could be synchronized to a cloud service as well. Joining collaborative applications is also possible by employing the above-described procedure of passing uniform resource identifiers (URIs) to specify a session identifier for collaborative applications, residing either as a cloud service, a server-homed service on a specific device, or within the control system or control surface directly.

Due to the bi-directional nature of the active NFC communication, it is possible to utilize this same communication method to activate/add/enable extra features to the control system itself, such features may be listed from the central controller 230 via NFC through the control surface 210, or via an otherwise shared medium Ethernet, Wi-Fi, Bluetooth from the Control Surface, etc. Such a feature may provide a list of available features or applications and allow instant download and activation within the control system.

Figure 4:
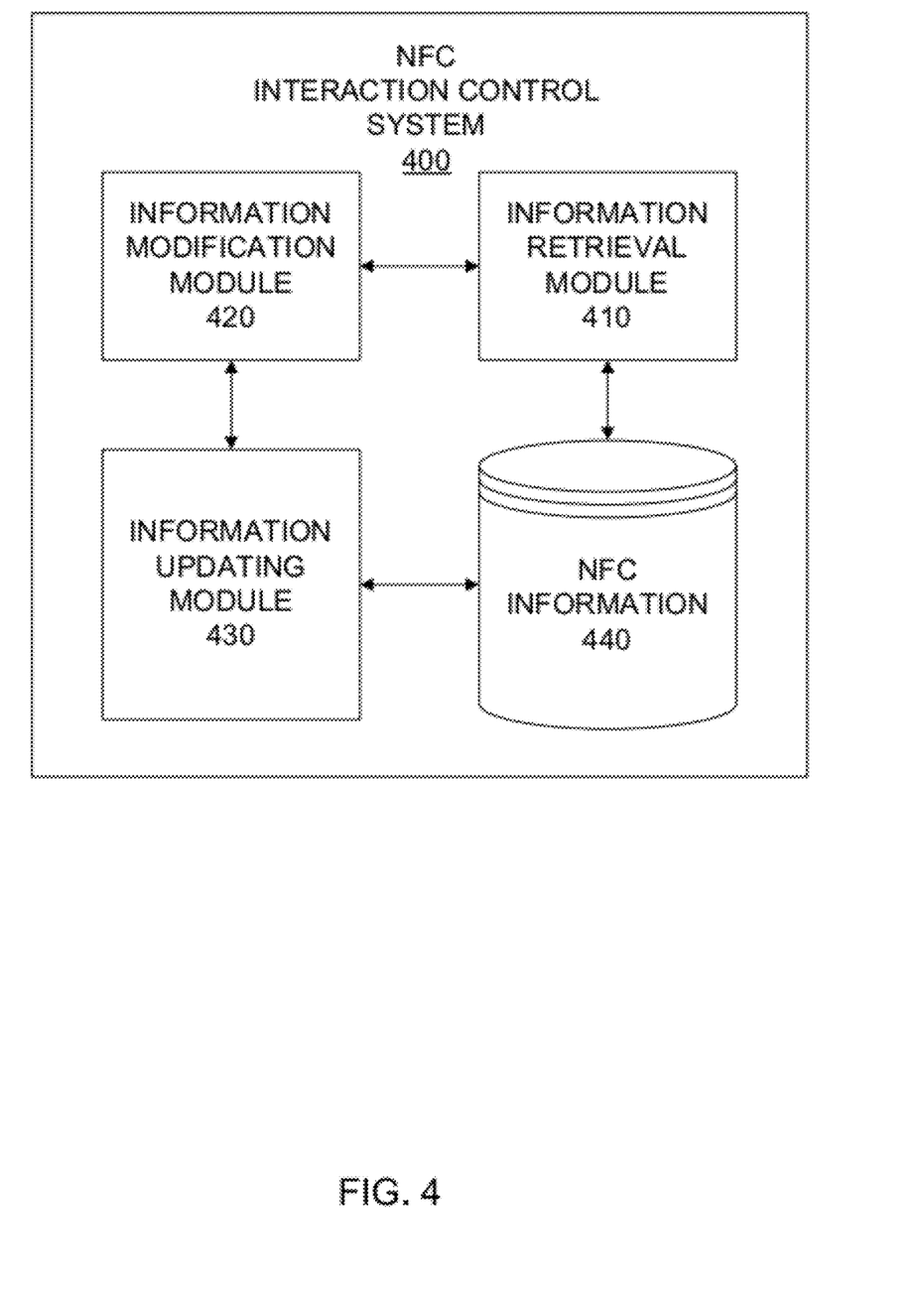
FIG. 4 illustrates an example near field communication (NFC) interaction control system according to example embodiments.

FIG. 4 illustrates an example NFC interaction control system 400 configured to perform operations according to example embodiments of the present invention. Referring to FIG. 4, the system 400 may access an application on a remote mobile device and identify at least one user information parameter responsive to a user action, or automatically in an effort to generate NFC messages and access the control system. The user may initiate the action by controlling the NFC application manually, or the NFC application may detect the control system via a Bluetooth or WiFi connection and generate the NFC message automatically in an effort to identify the user of the mobile device and gain access to the control system. The user information may be stored in the NFC information databank 440 and retrieved by the information retrieval module 410. Further operations may include generating a NFC message on the mobile device that includes the user specific information parameter and transmitting the NFC message. As a result, the control system 400 may have a NFC transceiver that receives the NFC message. The information included in the NFC message may be cross-referenced with pre-stored user information that is stored in the information databank 440.

The user information parameter(s) provided by the mobile station may identify at least one user preference. If the user information is not known by the system 400 then the information modification module 420 may store the information and parse one or more commands from the user information to initiate a control function used to operate a remote electronic device controlled by the control system, such as a peripheral light, motor control, a computer application, a relay, a binary logic signal interface (simple on/off reflection of state; e.g., a remote trigger), communications interface (e.g., serial port or network port whether wired or wireless), data service whether existing on a particular machine, or as a distributed/cloud service. A control message may be directed to a particular device, but may also be updated along with a token/preference/setting for some distributed/cloud service or application. The corresponding setting, in turn, may be enacted by autonomous entities or applications. As a result, a message may be transmitted to the ultimate application that is currently operating without even having knowledge of the existence or particular operations of the application. According to one example, waving a NFC tag at the control panel interface of the control system could ultimately impact an application or control indirectly at some indeterminate time in the future, including different applications depending on the computing infrastructure or user.

Examples of the user information may include a username, password and/or mobile device information. A generated NFC message on the mobile device may be displayed to a control device associated with the control system resulting in the automatic logging of the mobile device into a communication network operated by the control device. The mobile device may then receive wireless communication access responsive to the mobile device being logged into the communication network. Any information not previously stored in the control system 400 may be identified and stored in the databank 440 by the information updating module 430.

Figure 5:
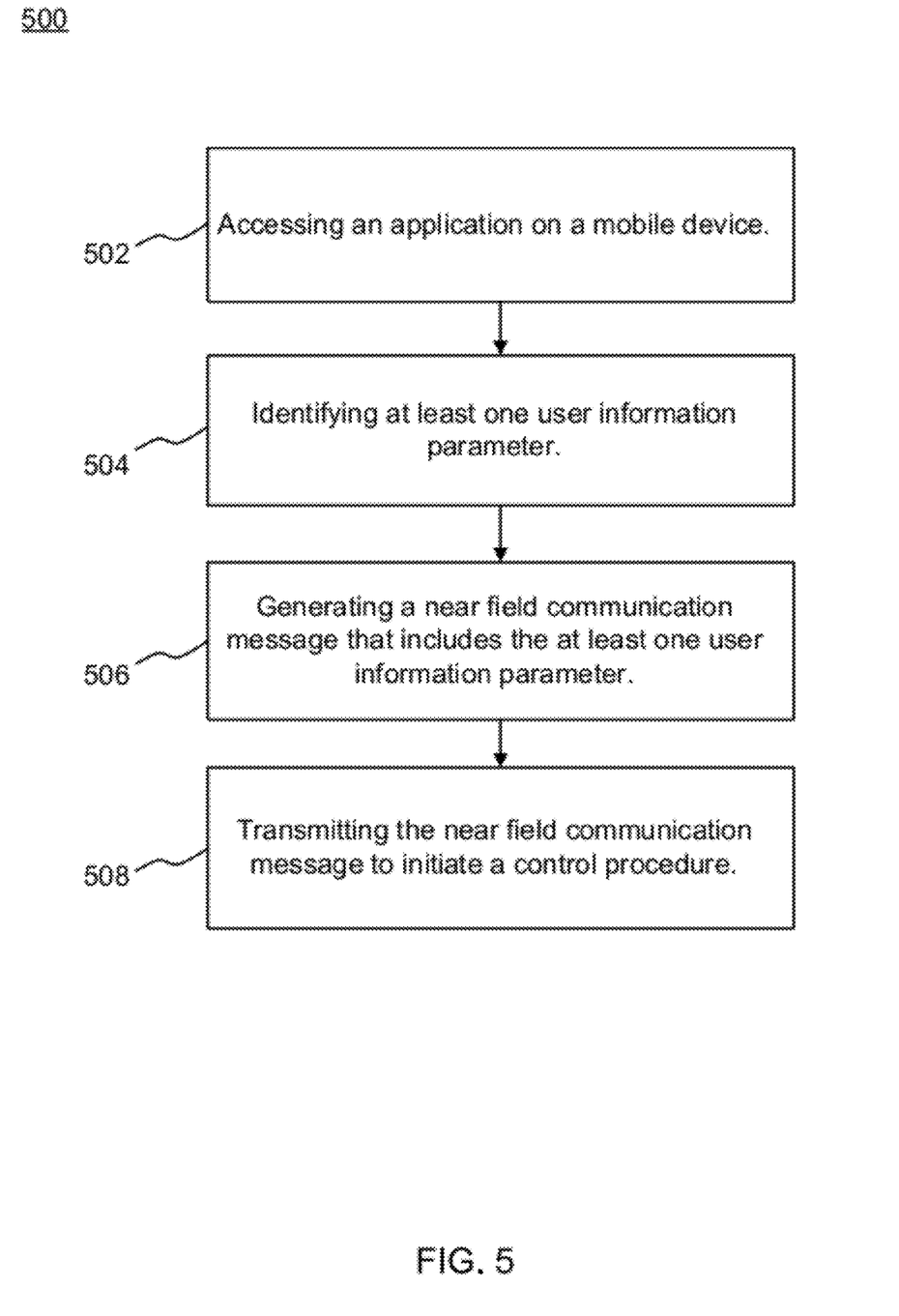
FIG. 5 illustrates a flow diagram of an example method of operation according to an example embodiment of the present invention.

One example method of operation is illustrated in the flow diagram of FIG. 5 Referring to FIG. 5 the flow diagram 500 includes accessing an application on a mobile device at operation 502. The method may also include identifying at least one user information parameter, at operation 504 and generating a near field communication message that includes the at least one user information parameter at operation 506. the method may still further include transmitting the near field communication message to initiate a control procedure at operation 508.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of FIGS. 1-4, etc.

Figure 6:
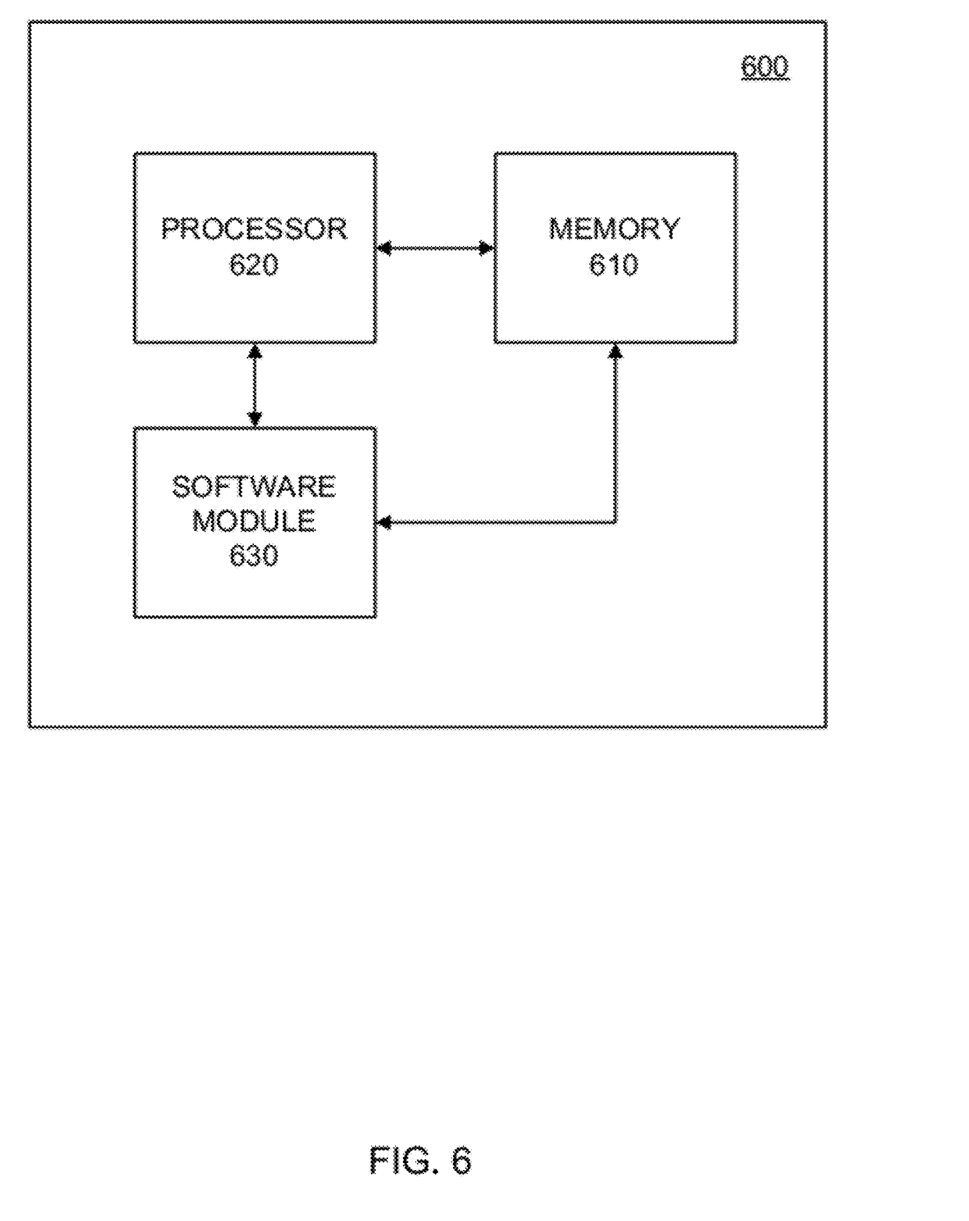
FIG. 6 illustrates an example network entity device configured to store instructions, software, and corresponding hardware for executing the same, according to example embodiments of the present invention.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems illustrated in FIGS. 1-4 can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   accessing an application on a mobile device;
   identifying at least one user information parameter responsive to a user action, the at least one user information parameter comprising at least one of a username, a password, and a mobile device information and the user action comprises activation of a near field communication application;
   generating a near field communication message via an active near field communication operation on the mobile device that includes the at least one user information parameter, at least one command and at least one request;
   transmitting the near field communication message to initiate a control procedure; and
   responsive to receiving the near filed communication message, identifying a user of the mobile device,
   generating an application-specific token,
   retrieving a plurality of user preferences,
   transmitting the application-specific token to a central controller, and
   responsive to receiving the application-specific token, applying the plurality of user preferences to
   power-on at least one remote electronic device,
   access at least one application, and
   access at least one user file to launch via the application and the remote electronic device.

2. The method of claim 1, wherein the at least one user information parameter identifies at least one user preference.

3. The method of claim 1, wherein the remote electronic device comprises at least one of a light, motor control, computer application, relay, binary logic signal interface and a communications interface.

4. The method of claim 1, further comprising:
automatically logging the mobile device into a communication network operated by a control device responsive to the generated application-specific token.

5. The method of claim 4, further comprising:
receiving wireless communication access at the mobile device responsive to logging the mobile device into the communication network.

6. An apparatus, comprising:
a processor configured to:
access an application on a mobile device,
identify at least one user information parameter responsive to a user action, the at least one user information parameter comprising at least one of a username, a password and a mobile device information and the user action comprises activation of a near field communication application,
generate a near field communication message via an active near field communication operation on the mobile device that includes the at least one user information parameter, at least one command and at least one request; and
a transmitter configured to transmit the near field communication message to initiate a control procedure, and wherein
responsive to the near filed communication message being received, the processor is further configured to
identify a user of the mobile device and generate an application-specific token,
transmit the application-specific token to a central controller, and
responsive to the application-specific token being received, apply the plurality of user preferences,
retrieve a plurality of user preferences to
power-on at least one remote electronic device,
access at least one application, and
access at least one user file to launch via the application and the remote electronic device.

7. The apparatus of claim 6, wherein the at least one user information parameter identifies at least one user preference.

8. The apparatus of claim 6, wherein the remote electronic device comprises at least one of a light, motor control, computer application, relay, binary logic signal interface and a communications interface.

9. The apparatus of claim 6, wherein the processor is further configured to automatically log the mobile device into a communication network operated by a control device responsive to the generated application-specific token.

10. The apparatus of claim 9, further comprising:
a receiver configured to receive wireless communication access at the mobile device responsive to logging the mobile device into the communication network.

11. A non-transitory computer readable storage medium configured to store instructions that when executed cause a processor to perform:
accessing an application on a mobile device;
identifying at least one user information parameter responsive to a user action, the at least one user information parameter comprising at least one of a username, a password, and a mobile device information and the user action comprises activation of a near field communication application;
generating a near field communication message via an active near field communication operation on the mobile device that includes the at least one user information parameter, at least one command and at least one request;
transmitting the near field communication message to initiate a control procedure; and
responsive to receiving the near filed communication message, identifying a user of the mobile device,
generating an application-specific token,
retrieving a plurality of user preferences,
transmitting the application-specific token to a central controller, and
responsive to receiving the application-specific token, applying the plurality of user preferences to
power-on at least one remote electronic device,
access at least one application, and
access at least one user file to launch via the application and the remote electronic device.

12. The non-transitory computer readable storage medium of claim 11, wherein the at least one user information parameter identifies at least one user preference.

13. The non-transitory computer readable storage medium of claim 11, wherein the remote electronic device comprises at least one of a light, motor control, computer application, relay, binary logic signal interface and a communications interface.

14. The non-transitory computer readable storage medium of claim 11, wherein the processor is further configured to perform:
automatically logging the mobile device into a communication network operated by a control device responsive to the generated application-specific token; and
receiving wireless communication access at the mobile device responsive to logging the mobile device into the communication network.

* * * * *